US012116173B2

(12) United States Patent
den Boer et al.

(10) Patent No.: US 12,116,173 B2
(45) **Date of Patent: *Oct. 15, 2024**

(54) CAPSULE AND PLUG FOR A CONCENTRATED REFILL CAPSULE

(71) Applicant: Conopco Inc., Englewood Cliffs, NJ (US)

(72) Inventors: Sebastiaan Wilhelmus Josephus den Boer, Ede (NL); Matthijs Lucas Bookelmann, Arnhem (NL); Willem Ramon, Ede (NL); Sjoerd Bastiaan Zwartkruis, Ede (NL)

(73) Assignee: Conopco Inc., Englewood Cliffs, NJ (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/611,595

(22) PCT Filed: May 22, 2020

(86) PCT No.: PCT/EP2020/064243

§ 371 (c)(1),
(2) Date: Nov. 16, 2021

(87) PCT Pub. No.: WO2020/239613

PCT Pub. Date: Dec. 3, 2020

(65) Prior Publication Data

US 2022/0177196 A1 Jun. 9, 2022

(30) Foreign Application Priority Data

May 24, 2019 (EP) .................................... 19176498

(51) Int. Cl.
*B65D 41/04* (2006.01)
*B05B 11/00* (2023.01)
(Continued)

(52) U.S. Cl.
CPC ...... *B65D 41/0414* (2013.01); *B05B 11/0097* (2013.01); *B65D 47/36* (2013.01); *B65D 81/3211* (2013.01)

(58) Field of Classification Search
CPC ........................... B65D 41/0414; B65D 47/36; B65D 81/3211; B65D 51/24; B05B 11/0097; B05B 11/0056
(Continued)

(56) References Cited

U.S. PATENT DOCUMENTS 3,134,494 A 5/1964 Quinn
3,426,931 A 2/1969 Jensen
(Continued)

FOREIGN PATENT DOCUMENTS

AU 2020286014 12/2021
CL 2017003187 6/2018
(Continued)

OTHER PUBLICATIONS

English Translation of Specification of JP-2012158361-A (Year: 2023).*
KSR International;Teleflex;No. 04-1350;2007; 2007; 1-7.

*Primary Examiner* — Kenneth Rinehart
*Assistant Examiner* — Stephanie A Shrieves
(74) *Attorney, Agent, or Firm* — N.V. Nederlandsch Octrooibureau

(57) ABSTRACT

A plug for use in a cap assembly of a refill capsule is disclosed. The plug (300) generally comprises a hollow tubular body (302) with an open proximal end that is surrounded by a first rim (304) that provides a proximal abutment surface for bearing against a frangible sealing component of a cap assembly. A tubular skirt wall (306) is arranged coaxially with respect to the tubular body, and extends around the skirt wall (306) to form a plug recess
(Continued)

(308) between the skirt wall (306) and the tubular body (302). The skirt wall (306) extends from a skirt distal end at which the skirt wall (306) is connected to the tubular body (302), to a free proximal end. The free proximal end of the skirt comprises an outwardly extending flange (310) comprising a distal facing abutment surface (312) for abutting a rim (406) of a refillable vessel (400).

17 Claims, 5 Drawing Sheets

(51) Int. Cl.
*B65D 47/36* (2006.01)
*B65D 81/32* (2006.01)

(58) Field of Classification Search
USPC .......................................................... 141/330
See application file for complete search history.

(56) References Cited

U.S. PATENT DOCUMENTS

| | | | | |
|---|---|---|---|---|
| D240,968 | S | 8/1976 | Hurst | |
| 4,144,983 | A | 3/1979 | Pauls et al. | |
| 4,903,865 | A | 2/1990 | Janowitz | |
| D319,841 | S | 9/1991 | Fukuda et al. | |
| 5,143,234 | A | 9/1992 | Klaus et al. | |
| 5,249,695 | A * | 10/1993 | Luch | B65D 47/121 229/125.17 |
| 5,303,837 | A * | 4/1994 | Adams | B65D 47/121 220/276 |
| 5,348,182 | A * | 9/1994 | Luch | B65D 39/00 215/253 |
| 5,413,233 | A | 5/1995 | Hall | |
| 5,465,835 | A | 11/1995 | Ziegler et al. | |
| 5,908,107 | A * | 6/1999 | Baudin | B65D 81/3211 215/DIG. 8 |
| 6,065,641 | A | 5/2000 | Valderrama | |
| 6,076,689 | A | 6/2000 | Vassallo | |
| D427,528 | S | 7/2000 | Krueger | |
| 6,237,649 | B1 | 5/2001 | Moisio et al. | |
| D467,805 | S | 12/2002 | Restrepo | |
| 6,533,113 | B2 | 3/2003 | Moscovitz | |
| D478,005 | S | 8/2003 | Sali | |
| 6,655,524 | B2 | 12/2003 | De Laforcade | |
| 6,772,807 | B1 | 8/2004 | Chang | |
| 6,793,101 | B2 * | 9/2004 | Shinozaki | B65D 47/103 222/153.07 |
| D498,423 | S | 11/2004 | Kostow | |
| 7,086,430 | B2 | 8/2006 | Walton | |
| D537,353 | S | 2/2007 | Beiley et al. | |
| 7,210,508 | B2 * | 5/2007 | Behar | B05B 11/0054 141/366 |
| D547,443 | S | 7/2007 | Sudo | |
| D555,498 | S | 11/2007 | Bansal | |
| 7,607,460 | B2 * | 10/2009 | Johns | B65D 81/3211 141/319 |
| 7,621,413 | B2 | 11/2009 | Miota et al. | |
| D606,661 | S | 12/2009 | Colombo | |
| 7,632,457 | B2 | 12/2009 | Calvert et al. | |
| D622,145 | S | 8/2010 | Walsh | |
| D623,481 | S | 9/2010 | Moran | |
| 7,861,873 | B1 | 1/2011 | Bragg et al. | |
| 8,226,126 | B2 | 7/2012 | Corey et al. | |
| 8,365,933 | B2 | 5/2013 | Jackel | |
| 8,443,970 | B2 | 5/2013 | Coon | |
| D702,092 | S | 4/2014 | Mettler et al. | |
| D705,288 | S | 5/2014 | Zimmerman | |
| 9,339,439 | B2 | 5/2016 | Nudo | |
| D790,624 | S | 6/2017 | Matsushita et al. | |
| 9,862,528 | B2 * | 1/2018 | Isogai | B65D 51/228 |
| D829,557 | S | 10/2018 | Shmagin et al. | |
| D836,404 | S | 12/2018 | Spivey et al. | |
| D849,542 | S | 5/2019 | Harris et al. | |
| 2002/0008106 | A1 | 1/2002 | Bezek et al. | |
| 2005/0205151 | A1 | 9/2005 | Behar | |
| 2005/0269281 | A1 | 12/2005 | Ding | |
| 2006/0201905 | A1 | 9/2006 | Perrin et al. | |
| 2007/0039975 | A1 | 2/2007 | Bochtler | |
| 2007/0095835 | A1 * | 5/2007 | Lohrman | B29C 45/16 220/258.2 |
| 2007/0289670 | A1 * | 12/2007 | Johns | B65D 81/3211 141/383 |
| 2013/0319970 | A1 | 12/2013 | Sugawara et al. | |
| 2014/0097106 | A1 * | 4/2014 | Broekaert | B65D 81/3211 206/222 |
| 2017/0043918 | A1 | 2/2017 | Guo | |

FOREIGN PATENT DOCUMENTS

| | | | | |
|---|---|---|---|---|
| CL | 2017003188 | | 6/2018 | |
| CL | 2011001048 | | 10/2021 | |
| CL | 2021003074 | | 11/2021 | |
| CL | 2021003086 | | 11/2021 | |
| CL | 2021003104 | | 11/2021 | |
| CL | 2021003103 | | 7/2022 | |
| CN | 1242751 | | 1/2000 | |
| CN | 1270915 | | 10/2000 | |
| CN | 1646046 | | 7/2005 | |
| CN | 1876515 | | 12/2006 | |
| CN | 101421171 | | 2/2007 | |
| CN | 101863343 | | 10/2010 | |
| CN | 102971225 | | 3/2013 | |
| CN | 103282287 | | 9/2013 | |
| CN | 107108083 | | 11/2015 | |
| CN | 105992742 | | 10/2016 | |
| CN | 106163939 | | 11/2016 | |
| CN | 106210049 | | 12/2016 | |
| CN | 106573710 | | 4/2017 | |
| EP | 0131132 | A2 * | 1/1985 | |
| EP | 0657381 | | 6/1996 | |
| EP | 2660165 | | 11/2013 | |
| EP | 3177259 | | 12/2019 | |
| FR | 2476607 | | 8/1981 | |
| FR | 2867761 | | 9/2005 | |
| GB | 2200898 | | 8/1988 | |
| GB | 2279069 | | 12/1994 | |
| GB | 2327409 | | 1/1999 | |
| JP | H0632351 | | 4/1994 | |
| JP | H11165756 | | 6/1999 | |
| JP | 2003284761 | | 10/2003 | |
| JP | 2004099082 | | 4/2004 | |
| JP | 2011016581 | | 1/2011 | |
| JP | 2011016588 | | 1/2011 | |
| JP | 2012035873 | | 2/2012 | |
| JP | 2012158361 | | 8/2012 | |
| JP | 2012158361 | A * | 8/2012 | |
| JP | 2013525222 | | 6/2013 | |
| JP | 2014129140 | | 7/2014 | |
| JP | 2014129141 | | 7/2014 | |
| JP | 2015063342 | | 4/2015 | |
| JP | 2017074964 | | 4/2017 | |
| JP | 2019069799 | | 5/2019 | |
| RU | 2455213 | | 7/2012 | |
| RU | 2660059 | | 7/2018 | |
| RU | 2676664 | | 1/2019 | |
| WO | WO2007145773 | | 12/2007 | |
| WO | WO2010100892 | | 9/2010 | |
| WO | WO-2010100892 | A1 * | 9/2010 | B05B 11/0081 |
| WO | WO2012160117 | | 11/2012 | |

* cited by examiner

CAPSULE AND PLUG FOR A CONCENTRATED REFILL CAPSULE

TECHNICAL FIELD

The present invention relates to a plug for use in a cap assembly for a refill capsule configured to contain a concentrated cleaning product. The plug is configured to break a frangible seal within a cap assembly and deliver concentrated cleaning fluid to a refillable vessel through a generally hollow tubular body.

BACKGROUND OF THE INVENTION

Any discussion of the prior art throughout the specification should in no way be considered an admission that such prior art is widely known or forms part of the common general knowledge in the field.

WO2007/145773 describes a mixing unit comprising a sealed container joined to a second container.

JP2012-158361 describes a refill container that can facilitate refilling work.

Liquid cleaning and hygiene products such as multi-purpose surface cleaner, glass cleaner, or degreaser are often supplied in ready-to-use concentrations in a wide variety of containers, with a wide variety of dispensing systems. Typically, such liquid cleaning products comprise one or more active ingredients diluted with water (or another solvent) to a concentration that is suitable for use in the home or commercial environment.

Cleaning products supplied in a ready-to-use concentration are advantageous in that the products can be supplied in a safe and effective concentration, and can be appropriately labelled. Ready-to-use products are also more convenient for the user, since they do not require dilution or reconstitution before use.

One example of a widely used container system for cleaning products is a spray bottle comprising a trigger actuator. Such systems generally comprise a bottle comprising a body and a neck, the neck being configured to engage a removable spray nozzle. The spray nozzle is generally secured to the neck of the bottle by way of complementary screw threads on the neck and on the nozzle. After use, the container or vessel in which the cleaning product was supplied is typically discarded and a replacement acquired.

Although the spray bottle in which cleaning products are supplied generally have a lifetime that extends beyond the point at which the cleaning product has been depleted, the practice of refilling spray bottles with cleaning product is not widespread in a domestic setting.

In a commercial or industrial setting, spray bottles are sometimes refilled for re-use by diluting a predetermined volume of concentrated liquid with water. The concentrated cleaning liquid may be supplied in a bottle, which typically has a larger volume than the spray bottles used by cleaning professionals due to the fact that the concentrate vessel is not carried throughout the cleaning process.

However, although it is known to supply concentrated cleaning fluids for dilution prior to use, the practice of refilling spray bottles with water and a concentrated cleaning fluid is not widespread due to the many challenges in safely and effectively managing concentrated products, especially in a home environment.

Handling of concentrated cleaning fluids requires care both during refilling of a spray vessel and with regard to storage of the concentrated liquid. To avoid risks to health, even more so than diluted cleaning fluids, concentrated cleaning fluids should be transported and stored securely, and kept out of reach of children and animals.

Moreover, concentrated (undiluted) cleaning fluids may cause damage to surfaces within the home and spillages should be avoided to avoid damage to clothing and household items.

Further difficulties may be encountered in ensuring that the concentrated cleaning product is diluted to a safe and effective concentration. Over-dilution of a concentrated cleaning fluid with water may lead to inferior cleaning results. Under-dilution of a concentrated cleaning fluid may present a risk to health, damage to household items and excessive consumption of the concentrated cleaning fluid.

Despite a desire to reduce the plastic waste generated by discarding empty bottles, and a desire to reduce the costs and resources required to ship and store ready-to-use cleaning products, refill systems that are suitable and convenient for use in domestic and professional settings are not widely available.

The present inventors have been able to solve many of the problems associated with conventional cleaning product dispensing systems and have been able to develop a refill capsule system for use with spray bottles (and other cleaning product vessels) that can overcome many of the above problems.

An object of the present invention is to provide a refill capsule and an associated plug configured to rupture a seal over the refill capsule that overcome the above mentioned disadvantages associated with current cleaning products that allows vessels or containers for cleaning products to be reused.

It is another object of the invention to provide a refill system comprising a plug that allows a user to safely and reliably deliver a predetermined volume of concentrated cleaning fluid to a spray bottle or similar vessel for dilution.

It is another object of the invention to provide a refill capsule and an associated plug that allows for safe and reliable delivery of a concentrated cleaning fluid to a refillable vessel.

It is yet another object of the invention to provide a refill capsule and a cap assembly comprising a plug that can be simply and reliably coupled to a refillable vessel to discharge the concentrated liquid into the refillable vessel.

These and other objects are accomplished by the invention described in the following text and figures.

SUMMARY OF THE INVENTION

In a first aspect of the present invention, there is provided a plug configured to rupture a frangible seal which closes and seal a refill capsule for a concentrated cleaning liquid. The plug comprises an abutment surface for beating against a closure member to break a frangible seal securing the closure member in place. The plug is configured to allow the flow of fluid therethrough.

The plug according to the invention is described in the claims appended herewith. Optional features are described in the dependent claims.

The plug according to the invention allows a volume concentrated cleaning fluid to be safely and conveniently stored and transported. A cap system comprising the improved plug can be engaged, for example by virtue of a threaded engagement, with a refillable vessel. Upon engagement of the system with a refillable vessel, the plug moves within the cap assembly and the frangible seal is configured to break under the influence of the plug, thereby releasing the concentrated cleaning fluid contained in a capsule to flow through the plug into the refillable vessel.

DETAILED DESCRIPTION OF THE INVENTION

In the following, it should be note that the term 'comprising' encompasses the terms 'consisting essentially of' and 'consisting of'. Where the term "comprising" is used, the listed steps or options need not be exhaustive and further steps or features may be included. As used herein, the indefinite article 'a' or 'an' and its corresponding definite article 'the' means at least one, or one or more, unless specified otherwise.

The terms 'upstream' and 'downstream' as used herein refer to the direction of flow of fluid through the refill system during use, with fluid flowing from an upstream end to a downstream end. In the context of the present invention, fluid flows from an upstream refill capsule system into a downstream refillable vessel. The proximal direction is the upstream direction, whilst the distal direction is the downstream direction.

In specifying any range of values or amounts, any particular upper value or amount can be associated with any particular lower value or amount.

The various features of the present invention referred to in individual sections above apply, as appropriate, to other sections mutatis mutandis. Consequently features specified in one section may be combined with features specified in other sections as appropriate. Any section headings are added for convenience only, and are not intended to limit the disclosure in any way.

The invention is not limited to the examples illustrated in the drawings. Accordingly it should be understood that where features mentioned in the claims are followed by reference numerals, such numerals are included solely for the purpose of enhancing the intelligibility of the claims and are in no way limiting to the scope of the claims.

The present invention relates to a plug for a refill capsule system. The plug is configured to be secured within a cap assembly, and is configured to move between a first position and a second position with the cap assembly to break a frangible connection therein. The plug according to the invention comprises an improved configuration compared to known seal-rupturing plugs, as will be described in further detail below.

The plug according to the invention generally comprises a tubular body with an open proximal end and an open distal end. The open proximal end is surrounded by a first rim, which defines an opening. The rim further can comprises at least first and second cut-outs extending in a distal direction from the rim, with the proximal surface of the rim providing a proximal-facing abutment surface for bearing against a frangible sealing component. The proximal-facing abutment surface extends in a first plane that is orthogonal to a longitudinal axis A of the tubular body, and has at least two fold rotational symmetry with respect to the longitudinal axis A.

In at least one configuration the plug comprises: a hollow tubular body with an open proximal end and an open distal end, wherein the open proximal end is surrounded by a first rim that provides a proximal abutment surface for bearing against a frangible sealing component of a cap assembly; wherein the proximal abutment surface lies in a plane that is orthogonal to a longitudinal axis of the tubular body, and surface surrounds, in total, at least half of the open proximal end; a skirt extending around the tubular body, and comprising a tubular skirt wall arranged coaxially with respect to the tubular body, the skirt wall being spaced apart from the tubular body in a radial direction to form a plug recess between the skirt wall and the tubular body; wherein the skirt wall extends from a skirt distal end at which the skirt wall is connected to the tubular body, to a free proximal end, wherein the free proximal end of the skirt comprises: an outwardly extending flange comprising a distal facing abutment surface for abutting a rim of a refillable vessel.

The proximal-facing abutment surface of the plug can be provided by a continuous circumferential rim of the tubular body, terminating in a plane Q. Alternatively, the proximal-facing abutment surface can comprise a discontinuous rim comprising a plurality of cut-outs equally spaced circumferentially around the rim of the tubular body, wherein the cut-outs extend in a distal direction from the rim.

By providing a rotationally symmetric abutment surface configured to apply a net force along the longitudinal axis A, and perpendicular to the plane in which the frangible connection extends, the frangible connection can be configured to snap, failing around its circumference, rather than peeling from an initial breach around the seal. Such a circumferential failure of the seal can result in a snap or click sound that is audible to the user, thereby providing positive feedback that the frangible connection has been successfully broken and that the liquid contained in a capsule body can escape.

Moreover, by providing a rim that surrounds at least half of the circumference of the tubular body, the flow of fluid through the plug (and thus through the cap assembly), may be improved.

The plug also comprises an outwardly extending flange comprising a distal-facing abutment surface for abutting a rim of a refillable vessel.

The flange can be provided on a skirt that extends around the tubular body, the skirt comprising a generally tubular skirt wall arranged coaxially with respect to the tubular body, and being spaced apart from the tubular body in a radial direction to form a plug recess between the skirt wall and the tubular body.

Optionally, the skirt wall can be connected to the tubular body at a distal end of the tubular body, and extend proximally from the connection point to circumferentially surround the tubular body. The proximal end of the skirt wall can comprise a free end. The flange can extend from the free end of the skirt wall.

The free end of the skirt wall can further comprises a proximal sealing rim for sealing against a sealing surface of a cap assembly. The sealing rim can be provided on a proximal surface of the flange that provides the distal-facing abutment surface. In some examples, the proximal sealing rim may taper to a peak.

By providing a sealing rim, a seal can be formed between the proximal sealing rim and a corresponding surface of an associated cap assembly, for example, a connection wall joining the inner and outer walls of a dual-walled cap assembly. The sealing rim may be peaked. This can form an improved seal against the sealing surface of the cap assembly. The sealing peak may terminate in the same plane as the proximal-facing abutment surface.

The tubular body can further comprise at least one cut-out or slot in a wall of the tubular body. The cut out or slot can provide a discontinuity in the rim of the plug such that a broken cap part cannot settle over the cap to block the proximal opening of the tubular body because the rim does not extend in the same plane around the full circumference of the tubular body. This discontinuity may thus improve flow through the tubular body of the plug.

The rim can comprises two or more cut-outs, and preferably, two diametrically opposed cut outs.

The tubular body can further comprise a protrusion or ridge extending around an outer surface of the tubular body. Such a ridge can provide improved engagement of the plug with a cap assembly comprising a similar ridge, a corresponding groove, or solely by way of increasing the contact force between the plug and a cap assembly within a system.

The free proximal end of the skirt wall can further comprise at least one claw extending radially from the flange. The at least one claw can comprise a corresponding engagement feature (e.g. a screw thread) in the cap assembly. The claw can be configured to flex to allow movement of the plug in a proximal direction, but to prevent or resist movement of the plug in a distal direction. Optionally, the at least one claw comprises a curved claw with a distal-facing concave surface and a proximal-facing convex surface.

Advantageously, the at least one claw can comprises two claws, preferably three claws, and more preferable four or more claws.

The advantages of the plug assembly are applicable in many combinations of cap assemblies. In at least one exemplary configuration, the plug can be combined with a cap assemble to form a cap system.

The cap assembly can comprise an inner wall defining a conduit through the cap assembly, the conduit extending from an upstream end to a downstream end. An outer wall may surround the inner wall along at least a first portion of its length, wherein the outer wall is spaced from the first portion of the inner wall to define a circumferential void between the inner and outer walls extending from an open downstream end to a closed upstream end. A connecting wall can extend between the inner and outer walls to prevent fluid flow through the void, the connecting wall forming the closed upstream end of the void.

The cap assembly may further comprise a closure member configured to seal the conduit, the closure member comprising an upstream side and a downstream side. The closure member is sealed to the inner wall with a peripheral frangible connection located between proximal and distal ends of the conduit.

Preferably, the frangible connection extends in a plane P, which is orthogonal to a longitudinal axis of the conduit.

In such an exemplary configuration, the plug can be disposed within the cap assembly such that the outer wall of the cap assembly surrounds the plug (preferably extending beyond the distal end of the plug) and the inner wall of the cap assembly extends into the plug recess.

In this position, the proximal-facing abutment surface of the plug is aligned with and opposes the bearing surface of the closure member such that the plug can be moved in a proximal direction, to bear against the bearing surface of the cap, and break the frangible seal.

The frangible connection can be configured in different ways. For example, the frangible connection can be disposed between a first peripheral recess formed between the inner wall and a downstream side of the closure member, and a second peripheral recess between the inner wall and an upstream side of the closure member.

In an alternative configuration, the downstream recess can be omitted and instead inner surface of the inner wall immediately upstream of the frangible connection can be off-set radially from an inner surface of the wall immediately downstream of the frangible connection. Preferably, the upstream inner surface is offset radially outwardly from the downstream inner surface.

Offsetting the inner surface of the inner wall immediately upstream and immediately downstream of the closure member may provide multiple advantages. For example, offsetting the radial position of the inner wall immediately upstream and downstream of the closure member can control the width of the frangible connection at its thinnest part.

This provides a well-defined region in which the frangible connection breaks. Moreover, offsetting the radial position of the upstream inner wall compared to the downstream inner wall ensures that the closure member can be pushed into a region of the conduit that has a greater cross-sectional area than the cross-sectional area of the closure member. This can ensure that the closure member is pushed into a region in which it cannot block the conduit.

In plug/cap assembly combinations, the bearing surface of the cap assembly can extend in a plane that is orthogonal to the longitudinal axis of the conduit. Combined with the orthogonal proximal-facing abutment surface of the plug, this can ensure that the frangible connection snaps rather than peels.

The closure member in the cap assembly may be hollow and tapered, and taper from a downstream base to an upstream peak. For example, the closure member may be conical or frustoconical.

The hollow closure member may be open at the base, and is preferably oriented with the peak in an upstream direction and the base in a downstream direction.

The outer wall of the cap assembly can also comprises engagement means, e.g. a screw thread on its inner surface, and wherein the claws of the plug are configured to engage the engagement means of the cap assembly.

In at least some configurations, the inner wall of the cap assembly can comprise a protrusion or ridge extending radially inwardly from an inner surface of the inner wall. The ridge on the cap assembly can be configured to cooperate with a ridge on the plug to reduce the likelihood that the plug moves in the distal direction during transit or storage.

The plug described here may also be combined with the cap assembly in a refill system, which further comprises a capsule body for containing a concentrated cleaning product, wherein the capsule body is engaged with the cap assembly, and wherein an internal volume of the capsule body is in fluid communication with an upstream end of the conduit. The capsule body comprises an opening surrounded by a rim, and wherein the rim is configured to bear against the connecting wall of the cap assembly.

In an exemplary system, a shrink wrap cover extends around at least a portion of the capsule and at least a portion of the cap assembly.

It will be appreciated that the advantages provided by the plug described herein are not limited to the exemplary combinations described below. For example, the plug described herein may be combined with the cap assembly shown in the illustrated examples, or with other compatible cap assemblies. For example, although the illustrated examples include a plug in combination with a dual-walled cap assembly, plugs according to the present invention can also be combined with cap assemblies comprising a frangible seal formed across a single-walled conduit.

As used herein, the term 'refill capsule' refers to a capsule body suitable for a container for concentrated cleaning fluid.

FIGURES

By way of example, the present invention is illustrated with reference to the following figures, in which.

DETAILED DESCRIPTION OF THE FIGURES

In the detailed description of the figures, like numerals are employed to designate like features of various exemplified devices according to the invention.

Figure 1:
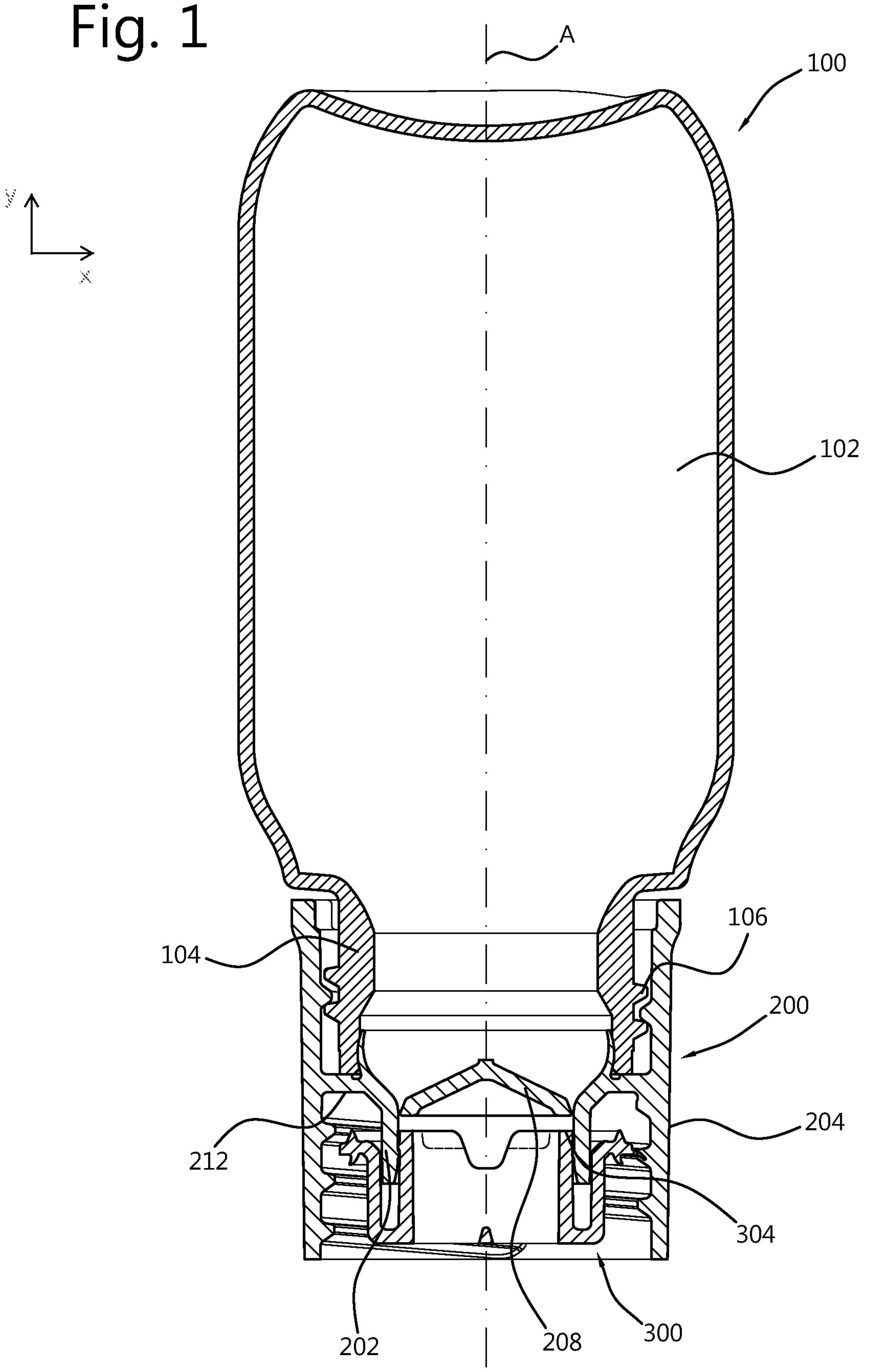
FIG. 1 shows a cross-sectional perspective view of a refill capsule comprising a capsule, a plug, and a cap assembly according to the present invention.

FIG. 1 shows a refill system 10 for containing a concentrated cleaning fluid and configured for use with a refillable vessel. FIG. 1 shows a cross-sectional view of an assembled refill system comprising a capsule body 100, a cap assembly 200, and a plug 300. As shown in FIG. 1, a longitudinal axis A extends from a closed end of the capsule 100, through the cap assembly 200, and the plug 300.

As shown in FIG. 1, the capsule body 100 comprises a generally hollow receptacle configured to receive a volume of concentrated cleaning fluid. The concentrated cleaning fluid is contained within an internal volume 102 of the capsule body 100. The capsule body 100 comprises a neck 104 comprising an open end surrounded by a rim 108. The neck 104 comprises a screw thread 106 configured to engage a corresponding screw thread on the cap assembly 200.

The cap assembly 200 is configured to seal the capsule and extends from an upstream end to a downstream end. The upstream end of the cap assembly 200 is configured to engage the capsule body 100. The downstream end of the cap assembly 200 is the end configured to engage a refillable vessel, as will be described in more detail with reference to FIGS. 2A and 2B.

The cap assembly 200 defines a conduit 203 through the cap assembly 200 though which fluid can flow to exit the capsule 100. The conduit 203 extends through the cap assembly 200 from an open upstream end to an open downstream end. A closure member 208 seals the conduit 203 to prevent fluid communication between the upstream end and the downstream end of the conduit 203. The closure member 208 is sealed to the inner wall of the conduit by a frangible seal, which can be broken by applying pressure to the closure member 208.

The plug 300 is disposed within the cap assembly 200 and is configured to bear against the closure member 208 to break the frangible seal as the refill system 10 is screwed onto (or otherwise engaged with) a refillable vessel. The plug 300 comprises an internal bore through which cleaning fluid can escape through once the plug 300 has been used to rupture the seal in the cap assembly 200.

Advantageously, the refill system 10 can be wrapped in a shrink wrap cover. The shrink wrap cover can cover the whole cap assembly 200 and the capsule 100, or it may cover only a portion of the capsule 100 and the capsule assembly 200. Advantageously, it may extend around the system 10 such that the join between the capsule 100 and the cap assembly 200 is surrounded by a shrink wrap cover. By shrink wrapping the capsule 100 and the cap assembly 200 together, the likelihood of the cap assembly 200 being inadvertently removed from the capsule 100 is further reduced.

Figure 2B:
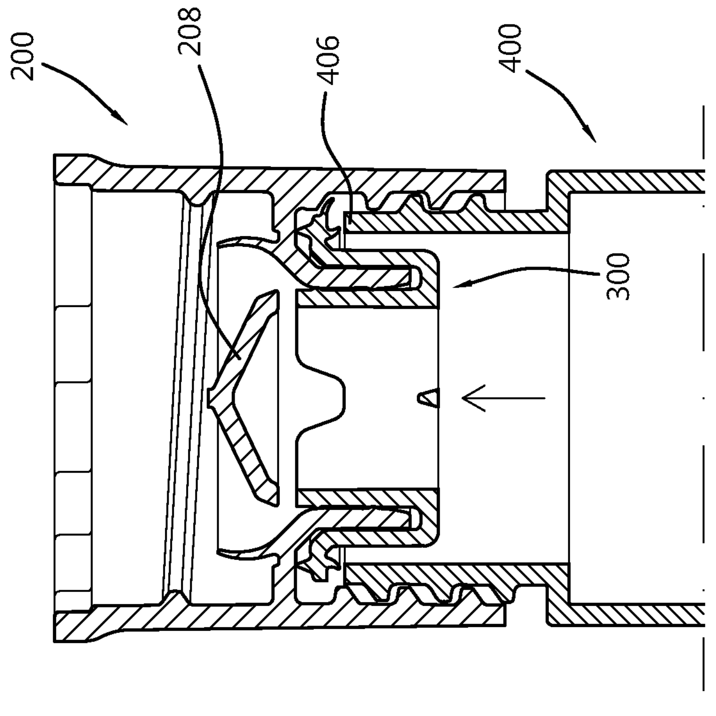
FIG. 2B shows a cross-sectional view of the refill system after rupture of the frangible seal.
Figure 2A:
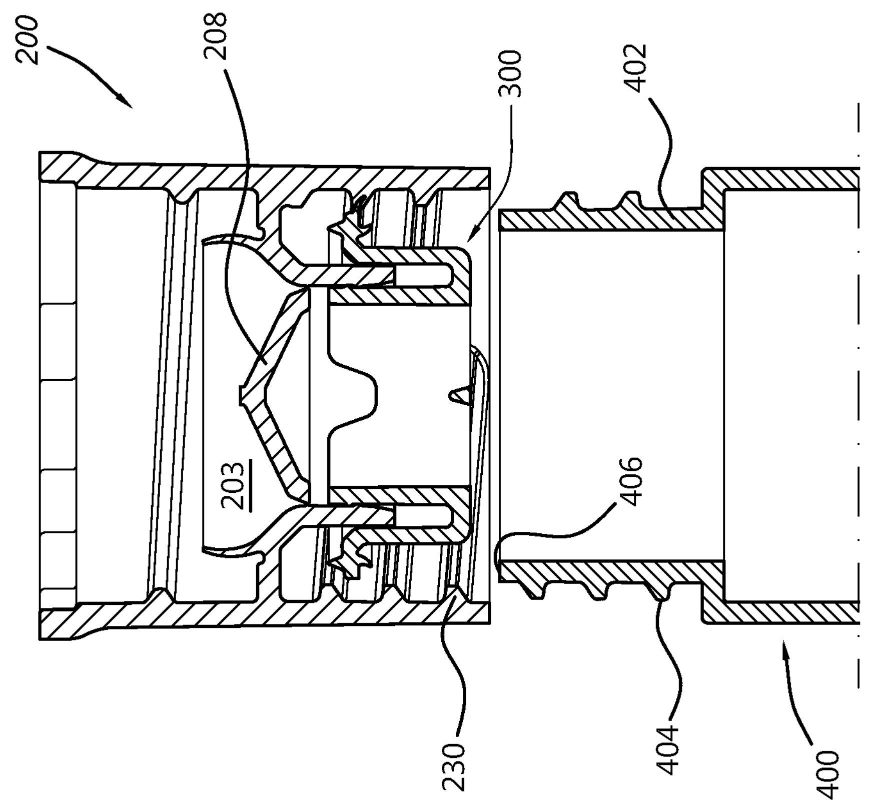
FIG. 2A shows a cross-sectional view of the refill system before rupture of the frangible seal.

Referring now to FIGS. 2A and 2B, use of the system will be described in more detail.

FIGS. 2A and 2B show an enlarged view of the refill system 10 comprising cap assembly 200, and plug 300. The capsule 100 is omitted for clarity. FIGS. 2A and 2B also show the upper portion of a refillable vessel 400 with a neck 402 that defines an opening in fluid communication with an interior volume of the vessel.

FIG. 2A shows the system before use with the closure member 208 sealed within the conduit 203. As shown in FIG. 2A, the refill system 10 is supplied with the plug 300 disposed within the cap assembly 200. In the configuration shown in FIG. 2A, the plug 300 is spaced apart from (i.e. not in direct contact with) the closure member 208. The plug 300 is mounted within the cap assembly 200 such that it is secured in place against accidental movement (e.g. during transport or storage). However, the plug 300 and the cap assembly 200 are configured such that the plug 300 can be pushed axially towards the closure member 208 by bearing on an abutment surface provided on the plug 300.

The plug 300 can be secured or mounted within the cap assembly 200 in different ways. An exemplary plug and cap assembly combination will be discussed in further detail with reference to FIGS. 3-6.

The cap assembly 200 comprises a screw thread 230 (or other engagement means) configured to engage the corresponding screw thread on a refillable vessel 400. The screw thread 230 allows the cap assembly 200 to be screwed onto the neck 402 of the refillable vessel 400. The screw thread 230 is provided on an interior surface of the cap assembly 200, whilst the screw thread 404 of the refillable vessel 400 is provided on an exterior surface of the vessel 400. Therefore, as the cap assembly 200 is screwed onto the neck 402 of the vessel 400, the neck 402 of the vessel 400 and the rim 406 with which the neck 402 terminates are guided into the cap assembly 200.

Referring now to FIG. 2B, the plug 300 is disposed within the cap assembly 200 such that the introduction of the neck 402 into the cap assembly 200 tends to bear against the plug 300, pushing it in an upstream direction, towards the capsule and into contact with the closure member 208. As shown in FIG. 2B, as the rim 406 advances within the cap assembly, the plug 300 is first brought into abutment with the closure member 208 and then begins to exert a force thereagainst as the rim 406 advances further. As the plug bears against the closure member 208, the force exerted against the closure member 208 increases to a point at which the frangible seal between the closure member and the conduit 203 fails, and the closure member 208 is pushed in an upstream direction such that it no longer seals the conduit 203.

Once the seal provided by the closure member 208 is broken, concentrated cleaning fluid flow from the internal volume of the capsule, through the conduit 203 of the cap assembly, through the internal bore of the plug 300, and into the refillable vessel 400 below.

Once the capsule has been emptied, the cap assembly 200 can be unscrewed from the neck 402 of the vessel 400, and discarded safely.

By providing a refill system as described above, it is possible to provide a safe, convenient, and effective way of delivering a controlled quantity of concentrated cleaning fluid to a refillable vessel.

Several advantages may be provided by the system described here, which may result in an improved refill system.

Improved Cap Assembly

The cap assembly 200 will now be described in more detail with reference to FIGS. 3A and 3B, which shows a cross-sectional view of the cap assembly 200. The plug 300 is omitted from FIGS. 3A and 3B.

The cap assembly described herein includes a number of improvements that may provide enhanced performance. The cap assembly may comprise an improved wall structure, an improved frangible seal, enhanced safety features, and improved audible and tactile feedback to the user. Each of these improvements will be described in more detail below. Moreover, it will be appreciated that the features described below may be incorporated in a refill system alone, or in combination with other features to provide a further improved product.

Figure 3A:
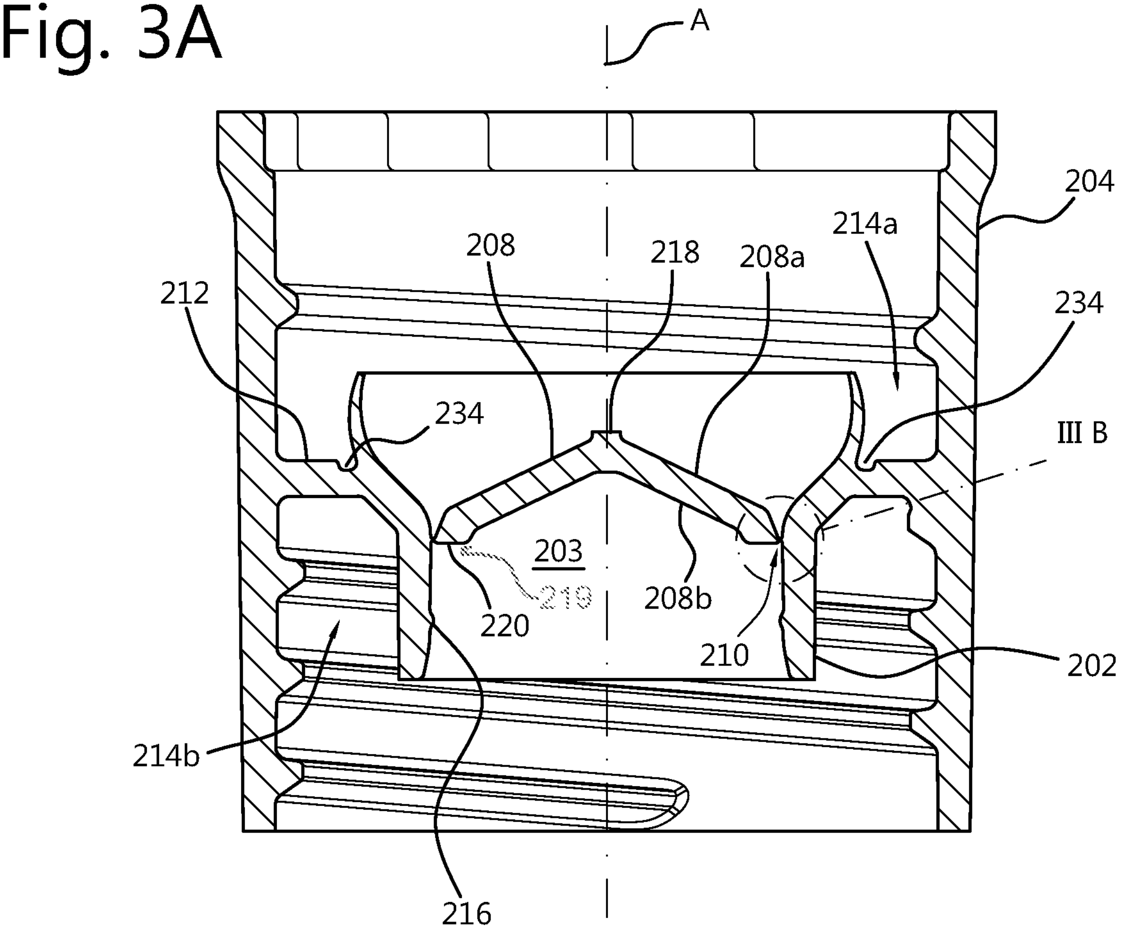
FIG. 3A shows a cross-sectional view of a cap assembly according to the present invention, the cap assembly comprising a frangible seal.

As shown in FIG. 3A, the cap assembly 200 comprises an inner wall 202 that defines a conduit 203 extending from an open upstream end to an open downstream end. A closure member 208 is positioned within the conduit 203 and has an upstream side 208*a* and a downstream side 208*b*. The closure member 208 is sealed around its periphery to the inner wall 202 with a frangible connection 210. The frangible connection is located between the upstream open end and the downstream open end of the conduit 203 and will be described as in more detail in FIG. 3B.

An outer wall 204 extends around the inner wall 202. The outer wall 204 is connected to the inner wall 202 by a connecting wall 212 or a connection portion. The connecting wall 212 extending between the inner and outer walls 202, 204 prevents the flow of fluid through the cap assembly between the inner and outer wall walls 202, 204. The only route through which fluid may flow through the cap assembly is thus through the inner conduit 203 when the frangible connection 210 has been broken.

The inner wall 202 is arranged coaxially within the outer wall 204 to form a circumferential void 214 between the inner and outer walls 202, 204. In the embodiment shown in FIG. 3A, the connecting wall 212 connects to each of the inner and outer walls 202, 204 part way along their length. This forms an upstream void 214*a* between the inner and outer walls 202, 204 upstream of the connection wall 212, and a downstream void 214*b* between the inner and outer walls 202, 204 downstream of the connecting wall 212.

By providing an upstream void 214*a,* the seal between the capsule 100 and the cap assembly 200 can be improved because the inner wall 202 can be specially adapted for forming a seal between the cap assembly 200 and the capsule 100 within the neck 104 of the capsule, whilst the outer wall can be 203 can be specially adapted to form a seal between the cap assembly 200 and the capsule around the neck 104 of the capsule 100. In at least some examples, the outer wall 204 can provide a child-resistant closure with the capsule 100. For example, the outer wall 204 can comprise a plurality of ratchet teeth (not shown) that mate with a plurality of ratchet teeth on the capsule 100 to allow the cap assembly 200 to be screwed onto the capsule 100, but prevent the cap assembly 200 from being unscrewed from the capsule assembly. The child resistant closure may prevent the cap assembly 200 from being unscrewed from the capsule 100 entirely (or at least without breaking the cap assembly 200) or it may be configured to prevent the cap assembly 200 from being unscrewed from the capsule 100 unless a predetermined axial force is applied to the cap assembly 200 in a direction towards the capsule 100.

Moreover, by providing an upstream void 214*a* to accommodate the neck 104 of the capsule 100, the neck 104 can be used to provide structural reinforcement to the cap assembly 200 to minimise the degree to which is flexes as pressure is applied to rupture the frangible seal 210. By minimising the degree to which the cap assembly 200 can flex under pressure from the plug, the frangible seal 208 is more likely to fail suddenly under pressure, resulting in a snap or click that provides audible and tactile feedback to the user that the seal is broken and that the concentrated liquid can be dispensed.

By providing a downstream void 214*b,* at least a portion of the plug 300 can be accommodated between the inner and outer walls 202, 204. This can allow the plug 300 to be retained within the cap assembly 200 during transport and storage, and held securely in place until the user screws the refill system 10 onto a refillable vessel.

It will be appreciated that although the provision of an upstream void 214*a* and a downstream void 214*b* can be combined to provide enhanced advantages over known systems, in at least some examples the cap assembly can comprise only an upstream void 214*a* or only a downstream void 214*b*.

The conduit 203 provided by the inner wall 202 of the cap assembly can have a variable diameter along its length. For example, the diameter of the conduit 203 upstream of the frangible seal 210 can be larger than the diameter of the conduit 203 downstream of the frangible seal 210. By increasing the diameter of the conduit 203 upstream of the frangible seal 210, the closure member 208 can be pushed by the plug 300 into a region of the conduit 203 that has a larger diameter than the closure member 208. This further reduces the likelihood that the closure member 208 can occlude the conduit 203 to prevent the egress of cleaning fluid from the capsule 100 through the cap assembly 200 and the plug 300.

In the embodiment shown in FIG. 3A, the inner wall 202 is shaped with a barrel shaped or bulbous upstream end portion to provide a barrel seal for sealing with the neck 104 of the refill capsule 100. Instead of comprising a cylindrical shape having sides that are substantially parallel, the upstream end of the conduit 203 is barrel shaped, steadily decreasing in transverse cross-sectional diameter (i.e. a cross-section in a plane perpendicular to the longitudinal axis A) from a maximum diameter upstream of the frangible seal 210 towards the upstream rim of the conduit 203. By varying the diameter of the conduit 203 at the upstream end, variation in manufacturing tolerances can be accounted for and/or a tighter seal can be provided between the capsule 100 and the cap assembly 200 because the narrower open end of the conduit 203 can be inserted into the neck 104 of the capsule 100, and a tight seal can be formed between the barrel sealing rim and the neck of the capsule 100.

Figure 5:
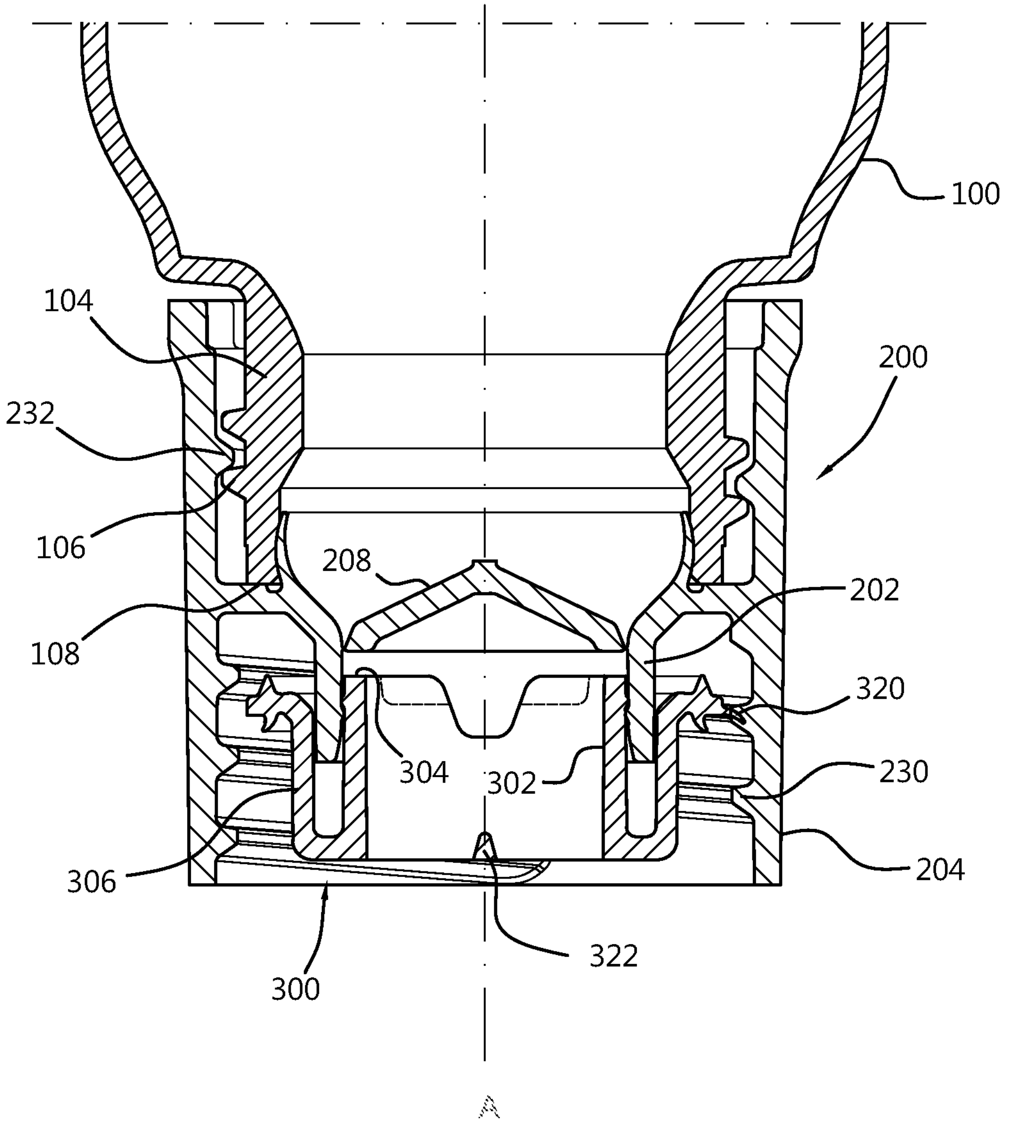
FIG. 5 shows an enlarged cross-sectional view of a proximal end of a refill capsule system comprising the cap system of FIG. 1.

As shown in FIG. 3A, the connecting wall 212 may further comprise a circumferential notch 234 or channel adjacent the inner wall 202 on the upstream side. The notch 234 reduces the thickness of the connecting wall 212 at the point where the inner wall 202 joins the connecting wall 212. This can increase the degree to which the upstream portion of the inner wall 202 can flex inwardly to fit within the neck 104 of the capsule 100 (as shown in FIG. 5).

The inner wall 202 downstream of the closure member 208 has a generally cylindrical form, with substantially parallel walls. However, as shown in FIG. 3A, the inner surface of the inner wall 202 can comprise a radially inwardly protruding ridge or projection 216. The ridge or projection 216 can advantageously engage a corresponding projection on the plug 300, as will be described in more detail below with reference to FIG. 5.

As shown in FIG. 3A, the closure member 208 is positioned within the conduit 23 formed by the inner wall 22 and closes the conduit to prevent the passage of fluid therethrough unless the frangible seal 210 is broken.

The closure member 208 shown in FIG. 3A comprises a conical or frustoconical shape, and extends from an upstream peak 218 to a downstream base 220. The base 220 is preferably open to allow access to the hollow interior of the conical closure member 208 from the downstream side. By providing a hollow, peaked closure member 208, the likelihood of the closure member 208 settling over the opening formed through the inner conduit after the seal has been broken is reduced. To the contrary, the buoyancy provided by the hollow closure member 208 means that the closure member tends to float away from the conduit 203.

The base 220 of the closure member provides a bearing surface against which a plug of a cap assembly can bear to apply pressure to rupture the frangible seal. The bearing surface 220 preferably extends in a plane R that is orthogonal to the longitudinal axis A of the cap assembly 200.

Figure 3B:
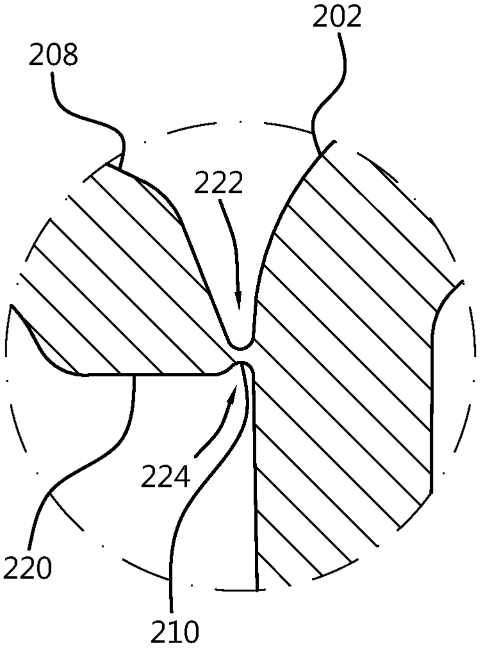
FIG. 3B shows an enlarged view of the frangible seal of FIG. 3A.

FIG. 3B shows an enlarged view of the frangible connection 210 formed between the closure member 208 and the inner wall 202. As shown in FIG. 3B, the frangible connection 210 extends between the outer perimeter of the closure member 208. The frangible connection 210 is preferably between 0.05 and 0.2 mm thick. However, the skilled person will appreciate that other dimensions may be chosen depending on the materials used and the dimensions of the system 10.

The frangible connection 210 is formed between two opposing recesses or notches 222, 224. The recesses or notches 222, 224 are shown in FIGS. 3B, which is a cross-sectional view. However, it will be appreciated that for a closure member 208 having a circular transverse cross-section, the recesses or notches 222, 224 may be formed as circumferential channels.

The first recess 224 is formed upstream of the frangible connection 210, between an upstream side 208*a* of the closure member 208 and an interior surface of the inner wall 202. The second recess 224 is formed downstream of the frangible connection 210, between a downstream side 208*b* of the closure member 208 and an interior surface of the inner wall 202. By forming a frangible connection 210 between two opposing recesses or channels, the thickness (in a longitudinal direction) and the width (in a transverse direction) of the frangible connection 210 can be controlled.

The notches 222 and 224 (or the channels) extend from an open end to a closed end, with the frangible connection forming the closed end in each case. The closed end of each recess or channel may advantageously have a rounded profile, as shown in FIG. 3B. By providing a frangible connection between opposing rounded notches or channels, the width of the frangible connection at the thinnest part is closely controlled.

It will be appreciated that the transverse width of the thinnest part of the frangible connection 210 can be controlled by varying the radius of curvature of the rounded notches. The smaller the radius of curvature of the first notches or recess 222 can be chosen to be substantially the same as the second notch or recess 224.

Referring again to FIG. 3A, the frangible connection 210 preferably extends in a plane P that is orthogonal to the longitudinal axis A of the cap assembly 200. By providing a flat seal (with respect to the longitudinal axis A), the frangible connection 210 tends to snap around its circumference at substantially the same time as the plug 300 bears on the bearing surface 220. This is contrast to a frangible connection that extends in a plane extending at a non-perpendicular angle to the longitudinal axis A, which tends to peel from the 'lower' end (the portion of the frangible connection that is first brought into close proximity with the plug) towards the 'upper' end (the portion of the seal that is furthest from the advancing plug).

Once of the advantages of the frangible connection breaking around the perimeter of the closure member 208 at the same time is that the frangible connection may fail suddenly, causing a snap or click as the frangible connection 210 is broken. The snap or click failure of the frangible connection can provide audible and/or tactile feedback to the user that the component sealing the refill system 10 has been broken and that the concentrated cleaning fluid disposed within the capsule body 100 will be dispensed.

The Plug

The plug 300 will now be described in more detail with reference to FIG. 4, which shows a cross-sectional view of the plug 300.

The plug described herein includes a number of improvements that may provide enhance performance. The plug may comprise an improved wall structure, an improved bearing surface for rupturing the frangible seal, enhanced safety features, and features that contribute to improved audible and tactile feedback to the user. Each of these improvements will be described in more detail below. Moreover, it will be appreciated that the features described below may be incorporated in a refill system alone, or in combination with other features to provide a further improved product.

Figure 4:
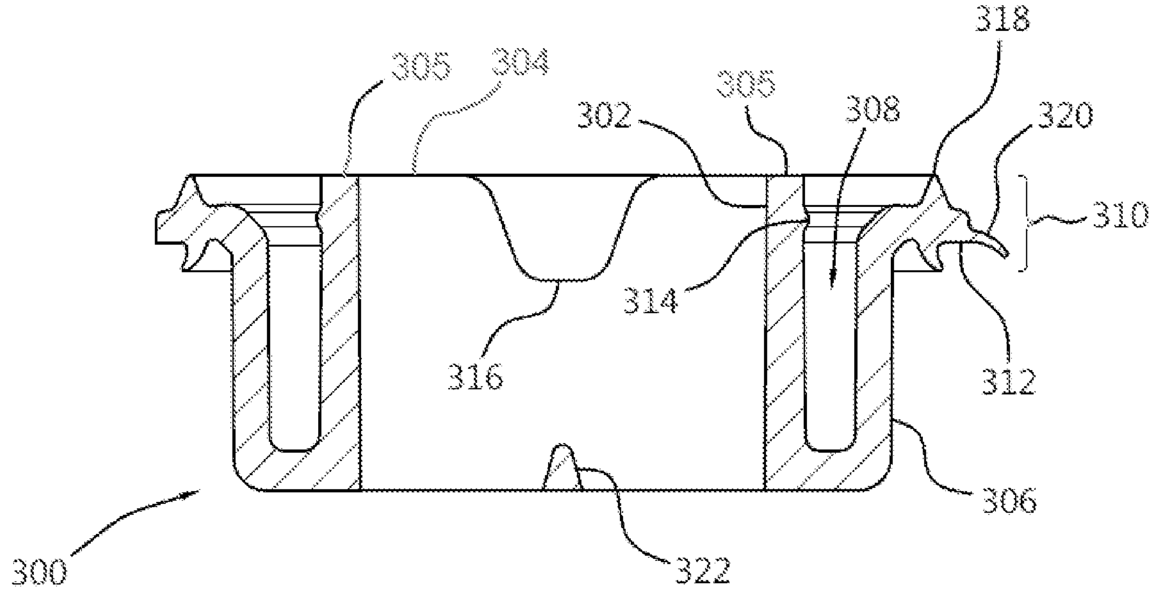
FIG. 4 shows a cross-sectional view of a plug according to the present invention.

As shown in FIG. 4, the plug 300 comprises a generally tubular body 302 defining an internal conduit therethrough, with a proximal abutment surface 304 (for engaging the bearing surface 220 on the closure member 208). The proximal abutment surface 304 is provided by the rim surrounding the open proximal end of the generally tubular body 302.

In the embodiment shown in FIG. 4, the plug 300 further comprises a skirt that extends around the tubular body 304. The skirt comprises a generally tubular skirt wall 306 that is arranged coaxially with respect to the tubular body 302, to provide a dual-walled plug. The skirt wall 306 is spaced apart from the tubular body 302 (in a radial direction) to form a plug recess 308 between the skirt wall 306 and the tubular body 302.

The skirt wall 206 is connected at its distal end to the distal end of the tubular body 302, and comprises a free proximal end. The free proximal end of the skirt 306 further comprises an outwardly extending flange 310 that provides a distal abutment surface 312 for abutting a rim of a refillable vessel 400 (see FIGS. 2A and 2B).

By providing a plug 300 comprising an inner tubular body 302 and an outer skirt 306, the plug assembly 300 can be more securely retained within the cap assembly 200. For example, the plug recess 308 can accommodate a component (e.g. inner wall 202) of the cap assembly to retain the plug 300 securely within the cap assembly 200 until the user screws the system 10 onto a refillable vessel 400.

The distal abutment surface 312 at the free end of the skirt wall 306 can be configured to provide multiple additional advantages. For example, the free end of the skirt wall 306 can comprise a proximal seal 318 configured to seal against the connecting wall 212 of the cap assembly 200. The proximal seal 318 can comprise a circumferential ridge comprising a peak. The peak provides a small surface area to be brought into contact with the connecting wall 212, thereby improving the seal.

The free proximal end of the skirt wall 306 can also comprise a one or more claws 320 configured to engage the threads 230 of the cap assembly 200. The engagement of the claw(s) 320 with the thread 230 can provide additional security that the plug 300 will remain in place within the cap assembly 200.

The claw(s) 230 may also retain the plug 300 within the cap assembly 200 after the product has been used. Since the plug 300 must be pushed into the cap assembly 200 to rupture the frangible connection 210, the claws are preferably configured to such that they can ride over the threads 230 of the cap assembly as the plug 300 advances towards the closure member 208. The claw(s) 230 may thus comprise a distal facing concave surface and a convex proximal surface.

As shown in FIG. 4, the plug 300 may further comprise a circumferential ridge or protrusion 314 on an outer surface of the tubular body 302. The ridge or protrusion 314 can be configured to engage with a corresponding ridge or protrusion (e.g. ridge 216) on a complementary cap assembly 200. This may further improved the retention of the plug 300 within the cap assembly before use.

As shown in FIG. 4, the plug 300 can also comprise one or more cut-outs or slots 316 in the wall of the tubular body 302. The cut-outs or slots preferably extend from the proximal rim 304 of the tubular body 302 partway along the tubular body 302. The discontinuity in the rim 304 formed by the cut-outs or slots 316 may advantageously improve the flow of fluid through the cap assembly 200 and the plug 300 after the frangible connection 210 has been broken, by ensuring that the closure member 208 cannot form a seal against the rim 304 of the plug 300.

In the embodiment shown in FIG. 4, the plug 300 comprises two diametrically opposed cut-outs 316 (although only one is visible in the cross-sectional view shown in FIG. 4). However, one cut-out may be provided, or three or more cut-outs can be provided in the tubular body 302.

Providing a discontinuity in the rim of the tubular body 302 may also provide the additional advantage of reducing the surface area of the abutment surface 304 that is brought into contact with the bearing surface 220 of the closure member 208, thereby increasing force per unit area exerted on the closure member 208.

Although not illustrated in the drawings, it will be appreciated that the closure member 208 may be modified (in addition to or as an alternative to the plug 300) to enhance the flow of cleaning fluid through the plug 300 and cap assembly 200 in a similar manner. For example, the closure member 208 may be modified to provide a discontinuity, such as a cut-out or recess, in the bearing surface 220 of the closure member 208 that prevents the closure member 208 from forming a seal with the plug 300 after the frangible connection has been broken.

As will be appreciated, a plug 300 comprising a planar rim 304 and a closure member 208 comprising a planar bearing surface 220 may form a seal against each other in the event that the closure member 208 settles over the opening of the tubular member 302 of the plug 300. Should the planar surfaces align and come into contact to form a seal around the perimeter of the rim 304, the closure member 208 could prevent the egress of fluid from the capsule 100 after the frangible connection 210 has been broken.

However, by providing one or more cut-outs or slots in either (or both) of the rim 304 or the bearing surface 220, in the event that the closure member 208 settles against the tubular body 302 of the plug, fluid contained in the capsule may still flow through the tubular body 302 of the plug 300 by way of the openings formed by the slots of cut-outs.

As shown in FIG. 4, the plug 300 may further comprise at least one barrier or beam 322 that extends across the distal opening of the tubular body 302. The beam 322 may extend across the diameter of the distal opening, or multiple beams can extend across the opening. The beam is configured to allow the flow of fluid therepast, but prevent or restrict the insertion of an object (e.g. a finger) into the conduit formed by the tubular body 302. This minimises the likelihood of the frangible connection 210 being broken inadvertently or improperly by way of an object passing through the tubular body 302.

The Refill System

As will now be described with reference to FIG. 5, when assembled, the capsule 100, the cap assembly 200, and the plug 300 can provide a system 10 providing yet further advantages.

FIG. 5 shows an enlarged view of the distal end of the refill system 10. The neck 104 of the capsule 100 is clearly shown, and the rim 108 that surrounds the opening in the neck 104. The neck 104 of the capsule 100 also comprises one or more threads 106 extending around the neck 104 (on an outer surface), which are configured to engage corresponding threads in the cap assembly 200.

The cap assembly 200 is also clearly shown. The cap assembly 200 comprises the dual walled construction described above with reference to FIGS. 3A and 3B. An inner surface of the outer wall 204 comprises one or more threads 232 that are configured to engage the threads 106 on the capsule 100.

The cap assembly 200 is screwed onto the capsule 100 such that the rim 108 of the neck 104 is disposed within the upstream void 214*a*. Advantageously, the rim 108 of the neck 104 abuts the connecting wall 212 of the cap assembly. By engaging the capsule 100 with the cap assembly 200 such that the rim 108 of the capsule 100 abuts the connecting wall of the cap assembly 200, the neck 104 of the connecting wall 212 against flexing as the plug 300 bears against the closure member 208. Moreover, by abutting the rim 108 of the capsule 100 against the connecting wall 212 of the cap assembly, additional security against leakage from the capsule can be provided.

The cap assembly 200 is further configured such that the upstream end of the inner wall 202 (which is optionally configured as a barrel shaped seal, as described above) is disposed within the neck 104 of the capsule 100. The inner wall 202 thus forms an additional seal with the neck 104 of the capsule 100.

The engagement between the plug 300 and the cap assembly 300 will now also be described with reference to FIG. 5. As shown in FIG. 5, the plug 300 is disposed within the cap assembly 200. The plug 300 shown in FIG. 5 is structurally similar to the plug described with reference to FIG. 4.

As illustrated, the plug 300 is disposed within the cap assembly 200 such that the distal end of the inner wall 202 of the cap assembly is disposed within the recess 308 formed between the tubular body 302 and the skirt wall 306. During assembly, the ridge 314 on the plug 300 is pushed passed the corresponding ridge 216 on the inner wall 202 of the cap assembly. The engagement of the two ridges 216 and 314 may help to retain the plug 300 within the cap assembly 200 during transport and storage of the system 10.

The one or more claws 320 of the plug 300 may also help to retain the plug 300 within the cap assembly 200 by engaging the threads 230 on the interior surface of the outer wall 204. Preferably, at least two claws are provided to securely engage the thread(s) 230 on of the cap.

The combination of the plug 300 and the cap assembly 200 described herein may be configured to prevent the closure member 208 blocking the flow of fluid through the cap assembly after the frangible connection 210 has been broken.

For example, as illustrated in the embodiment shown in FIG. 5, the inner wall 202 of the cap assembly 200 can be configured to have a first diameter downstream of the frangible connection 210 and a second, larger diameter upstream of the frangible connection 210. To ensure that the closure member 208 is pushed or lifted into a position in which it cannot seal against the inner wall 202 of the cap assembly 200 after the frangible connection 210 has been broken, the plug 300 can be configured such that the rim or abutment surface 304 can be moved upstream past the point at which the frangible connection 210 joins the closure member 208 to the inner wall 202. This can be achieved by ensuring that the maximum distance of travel of the plug 300 is not limited by the cap assembly until the rim 204 has pushed the closure member 208 into the increased diameter portion of the conduit 203.

In the example shown in FIG. 5, the maximum travel of the plug 300 towards the frangible connection 208 is the point at which the seal 318 on the skirt wall 306 abuts the connecting wall 212 of the cap assembly 200. In the embodiment illustrated, the rim 304 of the tubular body 302 and the seal 318 terminate in the same transverse plane. To ensure that the travel of the plug 300 is not limited until after the closure member has been lifted away from the narrower part of the conduit 203, the frangible connection 210 is positioned downstream of the connecting wall 212.

Alternatively (or additionally), the rim or abutment surface 304 of the plug 300 can extend proximally beyond the sealing surface 318 of the skirt wall 306.

The capsule 100, cap assembly 200, and plug 300 can be made of any suitable material known in the art. For example, the capsule, cap assembly, and the plug may be made of polyethylene or polypropylene, and may be formed by injection moulding techniques. Advantageously, the capsule 100 can be formed of polyethylene, whilst the cap assembly 200 and the plug can be formed of polypropylene.

It will be appreciated that aspects of the present invention include embodiments in which the features described above are provided alone or in combination with other features described here. For example, the frangible connection described above can be provided in a refill system having a cap assembly that screws directly onto the neck of a refillable vessel. In such systems, the cap can be configured such that the rim of the refillable vessel bears directly on the closure member to break the frangible connection and allow concentrated cleaning fluid to flow through the cap assembly into the refillable vessel.

Moreover, the plug described herein may be provided in a cap assembly having a different sealing arrangement to the arranged described herein. For example, the cut-outs and slots in the plug assembly that prevent a closure member sealing against the opening in the plug can be employed in cap assemblies with different structures, and with different closure members.

While the invention has been described with reference to exemplary or preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular or preferred embodiments or preferred features disclosed, but that the invention will include all embodiments falling within the scope of the appended claims.

The present invention also comprises the following clauses:

Clause 1. A cap assembly (200) for a refill capsule, the cap assembly comprising:
- an inner wall (202) defining a conduit (203) through the cap assembly (200), the conduit (203) extending from an upstream end to a downstream end;
- an outer wall (204) surrounding the inner wall (202) along at least a first portion of its length, wherein the outer wall (204) is spaced from the first portion of the inner wall (202) to define a circumferential void (214*a*, 214*b*) between the inner and outer walls (202, 204);
- a connecting wall (212) extending between the inner and outer walls (202, 204) to prevent fluid flow through the void between the inner and outer walls (202, 204);
- wherein the cap assembly (200) further comprises a closure member (208) configured to seal the conduit (203), the closure member (208) comprising an upstream side (208*a*) and a downstream side (208*b*), and a bearing surface (220) on its downstream side;
- wherein the closure member (208) is sealed to the inner wall (202) with a peripheral frangible connection (210) located between proximal and distal ends of the conduit (203),
- wherein the peripheral frangible connection (210) extends in a plane P, which is orthogonal to a longitudinal axis (A) of the conduit (203);
- wherein the frangible connection is disposed between a first peripheral recess (222) formed between the inner wall (202) and the downstream side (208*b*) of the closure member (208), and a second peripheral recess (224) between the inner wall (202) and the upstream side (208*b*) of the closure member (208).

Clause 2. The cap assembly (200) according to any preceding Clause, wherein the bearing surface (220) extends perpendicular to the longitudinal axis (A) of the conduit (203).

Clause 3. The cap assembly (200) according to any preceding Clause, wherein the closure member (208) is tapered, e.g. conical or frustoconical, and extends from a base (220) to a peak (218).

Clause 4. The cap assembly (200) according to any preceding Clause, wherein the closure member (208) is hollow and open at the base.

Clause 5. The cap assembly (200) according to any preceding Clause, wherein the closure member (208) is oriented with the peak (218) in an upstream direction and the base in a downstream direction.

Clause 6. The cap assembly (200) according to any preceding Clause, wherein the bearing surface (220) is adjacent to the frangible connection (210).

Clause 7. The cap assembly (200) according to any preceding Clause, wherein the conduit (203) has a first cross-sectional diameter upstream of the frangible connection (210) and a second cross-sectional diameter at the downstream of the frangible connection (210), and wherein the first cross-sectional diameter is greater than the second cross-sectional diameter.

Clause 8. The cap assembly (200) according to any preceding Clause, wherein the circumferential void comprises a downstream void (214*b*) extending from an open downstream end and terminating in a closed end at the connecting wall (212).

Clause 9. The cap assembly (200) according to any preceding Clause, wherein the void comprises an upstream void (214*a*) extending from an open upstream end, and terminating in a closed end at the connection wall (214).

Clause 10. The cap assembly (200) according to any preceding Clause, wherein the void comprises an upstream void (214*a*) and a downstream void (214*b*), and wherein the upstream and downstream voids (214*a*, 214*b*) are separated from each other by the connecting wall (212).

Clause 11. The cap assembly (200) according to any preceding Clause, wherein the outer wall (204) downstream of the connection wall (212) comprises engagement means, e.g. a screw thread (230), configured to engage corresponding engagement means (404) on a refillable vessel (400).

Clause 12. The cap assembly (200) according to any preceding Clause, wherein the outer wall (204) upstream of the connecting wall (212) comprises engagement means, e.g. a screw thread (232), configured to engage corresponding engagement means (106) on a refill capsule (100).

Clause 13. The cap assembly (200) according to any preceding Clause, wherein the inner wall (202) comprises a protrusion or ridge (216) extending radially inwardly from an inner surface of the inner wall (202).

Clause 14. The cap assembly (200) according to any preceding Clause, wherein the cap assembly (200) comprises polypropylene.

Clause 15. A cap system comprising the cap assembly (200) according to any preceding Clause, and further comprising a plug (300), wherein the plug (300) is movably mounted within the cap assembly (200) for movement in an axial direction, and wherein the plug (300) is configured to bear upon the bearing surface (220) of the closure member (208) to break the frangible connection (210) as it is advanced in a proximal direction.

Clause 16. The system according to any preceding Clause, wherein the plug (300) comprises:

a tubular body (302) with an open proximal end and an open distal end, wherein the open proximal end is surrounded by a first rim (304) that provides an proximal-facing abutment surface for bearing against the bearing surface (220) of the closure member (208);

a skirt extending around the tubular body (302), and comprising a tubular skirt wall (306) arranged coaxially with respect to the tubular body (302), the skirt wall (306) being spaced apart from the tubular body (302) in a radial direction to form a plug recess (308) between the skirt wall (306) and the tubular body (302), wherein the skirt wall (306) extends from a skirt distal end at which it is connected to the distal end of the tubular body (303), to a free proximal end, wherein the free proximal end of the skirt comprises:

an outwardly extending flange (310) comprising a distal facing abutment surface (312) for abutting a rim (406) of a refillable vessel (400), and wherein the plug (300) is disposed within the cap assembly (200) such that the downstream end of the inner wall (202) is disposed within the plug recess (308).

Clause 17. A refill system (10) comprising the system according to any preceding Clause, wherein the refill system further comprises a capsule (100) for containing a concentrated refill fluid, wherein the capsule (100) is engaged with the cap assembly (200) and wherein an internal volume of the capsule (100) is in fluid communication with an upstream end of the conduit (203).

Clause 18. The refill system (10) according to any preceding Clause, wherein the capsule (100) comprises an opening surrounded by a rim (108), and wherein the rim (108) abuts the connecting wall (212) of the cap assembly (200).

Clause 19. The refill system (10) according to any preceding Clause, further comprising a shrink wrap cover extending around at least a portion of the capsule (100) and at least a portion of the cap assembly (200).

Clause 20. A plug (300) for use in a cap assembly of a refill capsule, the plug (300) comprising:

a hollow tubular body (302) with an open proximal end and an open distal end, wherein the open proximal end is surrounded by a first rim (304) that provides a proximal abutment surface for bearing against a frangible sealing component of a cap assembly;

wherein thee proximal abutment surface is preferably configured to be brought into contact with the bearing surface of the closure member in such a manner that results in a net force being applied to the closure member along the longitudinal axis A, and perpendicular to the plane in which the frangible connection extends.

a skirt extending around the tubular body (302), and comprising a tubular skirt wall (306) arranged coaxially with respect to the tubular body (302), the skirt wall (306) being spaced apart from the tubular body (302) in a radial direction to form a plug recess (308) between the skirt wall (306) and the tubular body (302), wherein the skirt wall (306) extends from a skirt distal end at which the skirt wall (306) is connected to the tubular body (302), to a free proximal end, wherein the free proximal end of the skirt comprises:

an outwardly extending flange (310) comprising a distal facing abutment surface (312) for abutting a rim (406) of a refillable vessel (400).

Clause 21. The plug (300) according to any preceding Clause, wherein the free end of the skirt wall (306) further comprises a proximal sealing rim (318) for sealing against a sealing surface (212) of a cap assembly (200).

Clause 22. The plug (300) according to any preceding Clause, wherein the proximal sealing rim (318) tapers to a peak.

Clause 23. The plug (300) according to any preceding Clause, wherein the sealing peak (318) terminates in the same plane as the rim (304).

Clause 24. The plug (300) according to any preceding Clause, wherein the tubular body (202) further comprises at least one cut-out (316) or slot to form a discontinuity in the first rim (304), preferably two or more cut-outs, and preferably, two diametrically opposed cut outs.

Clause 25. The plug (300) according to any preceding Clause, wherein the tubular body (302) comprises a protrusion or ridge (314) extending around an outer surface of the tubular body (302).

Clause 26. The plug (300) according to any preceding Clause, wherein the free proximal end of the skirt wall (306) further comprises at least one claw (320) radially outwardly of the distal abutment surface (312).

Clause 27. The plug (300) according to any preceding Clause, wherein the at least one claw (320) curves away from the distal abutment surface (312) to provide a distal concave surface and a proximal convex surface.

Clause 28. The plug (300) according to any preceding Clause, wherein the at least one claw (320) comprises two claws, preferably three claws, and more preferable four or more claws (320).

Clause 29. The plug according to any preceding Clause, wherein the abutment surface of the plug preferably has at least two fold rotational symmetry with respect to the longitudinal axis A. For example, the abutment surface of the plug can be provided by a continuous circumferential rim of the tubular body, terminating in a plane Q. Alternatively, the abutment surface can comprise a discontinuous rim comprising a plurality of projections equally spaced circumferentially around the rim of the tubular body, wherein the projections terminate in the plane Q. The projections may take the form of teeth spaced equally around the circumference of the rim. For example, in the case of an abutment surface comprising two teeth, the teeth may be disposed diametrically opposite each other.

Clause 30. A cap system for a refill capsule, the cap system comprising:

the plug (300) of any preceding claim; and a cap assembly (200) comprising:

an inner wall (202) defining a conduit (203) through the cap assembly (200), the conduit (203) extending from an upstream end to a downstream end;

an outer wall (204) surrounding the inner wall (202) along at least a first portion of its length, wherein the outer wall (204) is spaced from the first portion of the inner wall (202) to define a circumferential void (214*b*) between the inner and outer walls (202, 204) extending from an open downstream end to a closed upstream end;

a connecting wall (212) extending between the inner and outer walls (202, 204) to prevent fluid flow through the void (214*b*), the connecting wall (212) forming the closed upstream end of the void (214*b*);

wherein the cap assembly (200) further comprises a closure member (208) configured to seal the conduit (203), the closure member (208) comprising an upstream side (208*a*) and a downstream side (208*b*), wherein the closure member (208) is sealed to the inner wall (202) with a peripheral frangible connection (210) located between proximal and distal ends of the conduit (203), wherein the frangible connection (210) extends in a plane P, which is orthogonal to a longitudinal axis (A) of the conduit (203); and wherein the plug (300) is disposed within the cap assembly (200) such that the outer wall (204) of the cap assembly (200) surrounds the plug (300), and the inner wall (202) of the cap assembly (200) extends into the plug recess (308), and wherein the proximal abutment surface (304) of the plug (300) is aligned with and opposes the bearing surface (220) of the closure member (208).

Clause 31. The system according to any preceding Clause, wherein the frangible connection (210) is disposed between a first peripheral recess (222) formed between the inner wall (202) and a downstream side (208*b*) of the closure member (208), and a second peripheral recess (224) between the inner wall (202) and an upstream side (208*b*) of the closure member (208).

Clause 32. The system according to any preceding Clause, wherein the bearing surface (220) extends in a plane that is perpendicular to the longitudinal axis (A) of the conduit (203).

Clause 33. The system according to any preceding Clause, wherein the closure member (208) is conical or frusto-conical, and extends from a base to a peak (218).

Clause 34. The system according to any preceding Clause, wherein the closure member (208) is hollow, and open at the base, and preferably wherein the closure member (208) is oriented with the peak (218) in an upstream direction and the base in a downstream direction.

Clause 35. The system according to any preceding Clause, wherein the outer wall (204) comprises engagement means, e.g. a screw thread (230) on its inner surface, and wherein the claws (320) are configured to engage the engagement means (230).

Clause 36. The system according to any preceding Clause, wherein the inner wall (202) comprises a protrusion or ridge (216) extending radially inwardly from an inner surface of the inner wall (202).

Clause 37. A refill system (10) comprising the system according to any preceding Clause, wherein the refill system further comprises a capsule (100) for containing a concentrated cleaning product, wherein the capsule (100) is engaged with the cap assembly (200) and wherein an internal volume of the capsule (100) is in fluid communication with an upstream end of the conduit (203).

Clause 38. The refill system (10) according to any preceding Clause, wherein the capsule (100) comprises an opening surrounded by a rim (104), and wherein the rim (104) bears against the connecting wall (212) of the cap assembly (200).

Clause 39. The refill system (10) according to any preceding Clause, further comprising a shrink wrap cover extending around at least a portion of the capsule (100) and at least a portion of the cap assembly (200).

The invention claimed is:

1. A plug for use in a cap assembly, the plug comprising:

a hollow tubular body with an open proximal end and an open distal end, wherein the open proximal end is surrounded by a first rim that provides a proximal abutment surface for bearing against a frangible sealing component of the cap assembly;

wherein the proximal abutment surface lies in a plane that is orthogonal to a longitudinal axis of the tubular body, and surface surrounds, in total, at least half of the open proximal end;

a skirt extending around the tubular body, and comprising a tubular skirt wall arranged coaxially with respect to the tubular body, the skirt wall being spaced apart from the tubular body in a radial direction to form a plug recess between the skirt wall and the tubular body, wherein the skirt wall extends from a skirt distal end at which the skirt wall is connected to the tubular body, to a free proximal end, wherein the free proximal end of the skirt comprises:

an outwardly extending flange comprising a distal facing abutment surface for abutting a rim of a refillable vessel; and at least one claw radially outwardly of the distal abutment surface.

2. The plug according to claim 1, wherein the free end of the skirt wall further comprises a proximal sealing rim for sealing against a sealing surface of the cap assembly.

3. The plug according to claim 2, wherein the proximal sealing rim tapers to a peak.

4. The plug of claim 3, wherein the sealing peak terminates in the same plane as the first rim.

5. The plug according to claim 1, wherein the tubular body further comprises at least one cut-out or slot to form a discontinuity in the first rim.

6. The plug of claim 5, wherein the tubular body further comprises diametrically opposed cut outs.

7. The plug according to claim 1, wherein the tubular body comprises a protrusion or ridge extending around an outer surface of the tubular body.

8. The plug according to claim 1, wherein the at least one claw curves away from the distal abutment surface to provide a distal concave surface and a proximal convex surface.

9. A cap system, the cap system comprising:

the plug of claim 1; and a cap assembly comprising:

an inner wall defining a conduit through the cap assembly, the conduit extending from an upstream end to a downstream end;

an outer wall surrounding the inner wall along at least a first portion of its length, wherein the outer wall is spaced from the first portion of the inner wall to define a circumferential void between the inner and outer walls extending from an open downstream end to a closed upstream end;

a connecting wall extending between the inner and outer walls to prevent fluid flow through the void, the connecting wall forming the closed upstream end of the void;

wherein the cap assembly further comprises a closure member configured to seal the conduit, the closure member comprising an upstream side and a downstream side, wherein the closure member is sealed to the inner wall with a peripheral frangible connection located between proximal and distal ends of the conduit, wherein the frangible connection extends in a plane P, which is orthogonal to a longitudinal axis (A) of the conduit; and wherein the plug is disposed within the cap assembly such that the outer wall of the cap assembly surrounds the plug, and the inner wall of the cap assembly extends into the plug recess, and wherein the proximal abutment surface of the plug is aligned with and opposes a bearing surface of the closure member.

10. The system according to claim 9, wherein the frangible connection is disposed between a first peripheral recess formed between the inner wall and a downstream side of the closure member, and a second peripheral recess between the inner wall and an upstream side of the closure member.

11. The system according to claim 9, wherein the bearing surface extends in a plane that is perpendicular to the longitudinal axis (A) of the conduit.

12. The system according to claim 9, wherein the closure member is conical or frustoconical, and extends from a base to a peak.

13. The system according to claim 9, wherein the outer wall comprises engagement means, and wherein the at least one claw is configured to engage the engagement means.

14. The system according to claim 9, wherein the inner wall comprises a protrusion or ridge extending radially inwardly from an inner surface of the inner wall.

15. A refill system comprising the system according to claim 9, wherein the refill system further comprises a capsule for containing a concentrated cleaning product, wherein the capsule is engaged with the cap assembly and wherein an internal volume of the capsule is in fluid communication with an upstream end of the conduit.

16. The refill system according to claim 15, wherein the capsule comprises an opening surrounded by a rim, and wherein the rim bears against the connecting wall of the cap assembly.

17. The plug of claim 1, wherein the proximal abutment surface has at least two fold rotational symmetry about the longitudinal axis.

* * * * *